United States Patent
Roesch et al.

(10) Patent No.: US 7,993,445 B2
(45) Date of Patent: Aug. 9, 2011

(54) NANOPARTICLES OF ALUMINA AND OXIDES OF ELEMENTS OF MAIN GROUPS I AND II OF THE PERIODIC TABLE, AND THEIR PREPARATION

(75) Inventors: Norbert Roesch, Gersthofen (DE);
Ernst Krendlinger, Friedberg (DE);
Anja Heinze, Meitingen/Erlingen (DE);
Karl Zeisberger, Gersthofen (DE);
Peter Klug, Grossostheim (DE);
Waltraud Simsch, Kelkhelm (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 12/693,961

(22) Filed: Jan. 26, 2010

(65) Prior Publication Data

US 2010/0162924 A1 Jul. 1, 2010

Related U.S. Application Data

(62) Division of application No. 11/988,711, filed on Jan. 11, 2008, now abandoned.

(30) Foreign Application Priority Data

Jul. 16, 2005 (DE) .......................... 10 2005 033393
Jul. 13, 2006 (WO) ................. PCT/EP2006/006853

(51) Int. Cl.
*C09C 1/40* (2006.01)
*C04B 35/10* (2006.01)
*C09C 1/02* (2006.01)
*C09K 3/14* (2006.01)

(52) U.S. Cl. .......... 106/461; 51/309; 106/401; 501/153; 977/773

(58) Field of Classification Search .................... 51/309; 166/401, 461; 501/153; 977/773
See application file for complete search history.

(56) References Cited

U.S. PATENT DOCUMENTS

| | | | |
|---|---|---|---|
| 4,799,938 A | 1/1989 | Janz et al. | |
| 4,954,462 A | 9/1990 | Wood et al. | |
| 5,185,299 A | 2/1993 | Wood et al. | |
| 5,190,967 A | 3/1993 | Tamamaki et al. | |
| 5,256,611 A | 10/1993 | Moltgen et al. | |
| 6,066,584 A | 5/2000 | Krell et al. | |
| 6,841,497 B1 | 1/2005 | Krell et al. | |
| 6,896,958 B1 | 5/2005 | Cayton et al. | |
| 7,022,305 B2 | 4/2006 | Drumm et al. | |
| 2003/0077221 A1 | 4/2003 | Chiruvolu | |
| 2003/0098529 A1 | 5/2003 | Drumm et al. | |
| 2004/0009118 A1 | 1/2004 | Phillips et al. | |
| 2004/0247520 A1 | 12/2004 | Martin et al. | |
| 2005/0276745 A1 | 12/2005 | Maki | |
| 2009/0173253 A1 | 7/2009 | Roesch et al. | |
| 2009/0226726 A1 | 9/2009 | Roesch et al. | |

FOREIGN PATENT DOCUMENTS

| | | |
|---|---|---|
| CN | 1712355 | 12/2008 |
| DE | 3883083 | 3/1994 |
| DE | 19922492 | 11/2000 |
| DE | 10035679 | 1/2002 |
| EP | 0263810 | 4/1988 |
| EP | 0524519 | 1/1993 |
| EP | 0678489 | 10/1995 |
| GB | 2184715 | 7/1987 |
| WO | WO 02/08124 | 1/2002 |
| WO | WO 03/031333 | 4/2003 |
| WO | WO 2004/089827 | 10/2004 |

OTHER PUBLICATIONS

Oberbach et al. "Methods for Producing Corundum at Low Temperatures" DKG 74 1997.*
USPTO Office Action for U.S. Appl. No. 11/990,584; US Publication 20090226726, mailed Oct. 2, 2006.
PCT Search Report for PCT/EP 2006/006853, mailed Sep. 29, 2006.
Monceau et al., "Surface Segregation and Morphology of Mg-Doped Alpha-alumina Powders" Journal of the European Ceramic Society, Elsevier Science Publishers, Barking, Essex, GB vol. 15, No. 9 pp. 851-858; XP 004047319, 1995.
German Office Action for DE 102006020515.4 mailed Nov. 29, 2006.

* cited by examiner

*Primary Examiner* — Jessica L Ward
*Assistant Examiner* — Alexander Polyansky
(74) *Attorney, Agent, or Firm* — Anthony A. Bisulca

(57) ABSTRACT

Nanoparticles are claimed which consist of 50-99.99% by weight of alumina and 0.01-50% by weight of metal oxide of elements of main group I and II of the Periodic Table. These nanoparticles are obtained by drying a suspension of aluminum chlorohydrate, oxide formers and, if desired, crystallization nuclei, followed by calcining and comminution of the resultant agglomerates.

18 Claims, No Drawings

NANOPARTICLES OF ALUMINA AND OXIDES OF ELEMENTS OF MAIN GROUPS I AND II OF THE PERIODIC TABLE, AND THEIR PREPARATION

CROSS REFERENCE TO RELATED APPLICATION

This Application is a divisional application of application Ser. No. 11/988,711 filed Jan. 11, 2008, the entire contents are hereby incorporated herein by reference.

The present invention relates to nanoparticles and their preparation, the nanoparticles consisting of $Al_2O_3$ with proportions of oxides of the elements of main groups I and II of the Periodic Table.

Fine alumina powders are used in particular for ceramic applications, for matrix reinforcement of organic or metallic layers, as fillers, as polishing powders, for the production of abrasives, as additives in paints and laminates and for further special applications.

The preparation of the ultrafine alumina powders is effected either by chemical synthesis, mechanical comminution methods or a thermophysical route.

The disadvantages of the processes according to the known prior art are that the yields per unit time are low owing to the long calcination times or, in the case of milling, the product is contaminated and still too coarse.

The object of the present invention is therefore to prepare nanocrystalline mixed oxides consisting of alumina and metal oxides of elements of main groups I and II of the Periodic Table by a process which gives high yields in a short time with minimum energy supply. The product produced thereby should be redispersible by simple means and thus be capable of giving stable nanosuspensions.

Contrary to the statements by various authors to date (report DKG 74 (1997) No. 11/12; DE 199 22 492), this object can be achieved starting from aluminum chlorohydrate (aluminum hydroxychloride).

Surprisingly, it has now been found that the mixed oxides of $Al_2O_3$ with a content of oxides of elements of the first and second main groups of the Periodic Table are distinguished in that the nanoparticles are formed in particularly fine form. Moreover, it has been found that the powders prepared contain very soft agglomerates which can be destroyed without problems on introduction of the mixed oxides into suitable solvents with moderate energy supply.

The invention relates to nanoparticles consisting of 50-99.99% by weight of alumina and 0.01-50% by weight of oxides of elements of main group I or II of the Periodic Table. The alumina in these mixed oxides is preferably present for the predominant part in the rhombohedral α-modification (corundum). Accordingly, the proportion of these mixed oxides of main group I or II is only permitted to be such that the claimed nanoparticle retains the corundum lattice. The mixed oxides according to the present invention preferably have a crystallite size of less than 1 µm, preferably less than 0.2 µm and particularly preferably from 0.001 to 0.09 µm. Particles according to the invention which are of this order of magnitude are to be referred to below as nanoparticles.

The mixed oxides according to the invention can be prepared by different processes described below. These process descriptions relate to the preparation of only pure alumina particles, but it is self evident that, in addition to Al-containing starting compounds, those compounds of elements of main group I or II of the Periodic Table must also be present in the case of all these process variants in order to form the mixed oxides according to the invention. The chlorides, but also the oxides, oxide chlorides, carbonates, sulfates and other suitable salts, are preferred for this purpose. The amount of such oxide formers is such that the prepared nanoparticles contain the abovementioned amounts of oxide MeO. In the context of the present invention, MgO and CaO are preferred as oxide MeO.

Very generally, relatively large agglomerates of these mixed oxides are used as starting material in the preparation of the nanoparticles according to the invention and are then deagglomerated to the desired particle size. These agglomerates can be prepared by processes described below.

Such agglomerates can be prepared, for example, by various chemical syntheses. They are generally precipitation reactions (hydroxide precipitation, hydrolysis of organometallic compounds) with subsequent calcination. Crystallization nuclei are frequently added in order to reduce the transformation temperature to α-alumina. The sols thus obtained are dried and are converted into a gel thereby. The further calcination then takes place at temperatures of from 350° C. to 650° C. For the transformation to α-$Al_2O_3$, ignition must then be effected at temperatures of about 1000° C. The processes are described in detail in DE 199 22 492.

A further route is the aerosol process. There, the desired molecules are obtained from chemical reactions of a precursor gas or by rapid cooling of a supersaturated gas. The formation of the particle takes place either by collision or the constant vaporization and condensation of molecular clusters in equilibrium. The newly formed particles grow through further collision with product molecules (condensation) and/or particles (coagulation). If the coagulation rate is greater than that of new formation or of growth, agglomerates of spherical primary particles form. Flame reactions represent a preparation variant based on this principle. Here, nanoparticles are formed by the decomposition of precursor molecules in the flame at 1500° C.-2500° C. The oxidations of $TiCl_4$, $SiCl_4$ and $Si_2O(CH_3)_6$ in methane/$O_2$ flames, which lead to $TiO_2$ and $SiO_2$ particles, may be mentioned as examples. With the use of $AlCl_3$, it has been possible to date to produce only the corresponding alumina. Flame reactors are used today industrially for the synthesis of submicroparticles, such as carbon black, pigment $TiO_2$, silica and alumina.

Small particles can also be formed with the aid of centrifugal force, compressed air, sound, ultrasound and further methods, also from drops. The drops are then converted into powder by direct pyrolysis or by in situ reactions with other gases. Spray-drying and freeze-drying may be mentioned as known processes. In spray pyrolysis, precursor drops are transported by a high temperature field (flame, oven), which leads to rapid vaporization of the readily volatile component or initiates the decomposition reaction to give the desired product. The desired particles are collected in filters. The preparation of $BaTiO_3$ from an aqueous solution of barium acetate and titanium lactate may be mentioned here as an example.

It is also possible to attempt to comminute corundum by milling and produce crystallites in the nano range thereby. The best milling results can be achieved with stirred ball mills in wet milling. Milling beads comprising a material which has a greater hardness than corundum must be used.

A further route for the preparation of corundum at low temperature is the transformation of aluminum chlorohydrate. Seeds, preferably of very fine corundum or hematite, are added thereto for this purpose. For avoiding crystal growth, the samples must be calcined at temperatures of about 700° C. to not more than 900° C. The duration of the calcination here is at least 4 hours. A disadvantage of this method was therefore the considerable time required and the residual amounts of chlorine in the alumina. The method was described in detail in report DKG 74 (1997) No. 11/12, pages 719-722.

The nanoparticles must be liberated from these agglomerates. This is preferably effected by milling or by treatment with ultrasound. According to the invention, this deagglomeration is effected in the presence of a solvent and of a coating material, preferably a silane, which saturates the resulting active and reactive surfaces by chemical reaction or physical attachment during the milling process and thus prevents reagglomeration. The nano-mixed oxide remains as a small particle. It is also possible to add the coating material after deagglomeration is complete.

In the preparation according to the invention of the mixed oxides, it is preferable to start from agglomerates which are prepared according to the information in report DKG 74 (1997) No. 11/12, pages 719-722, as described above. The starting point here is aluminum chlorohydrate, which is attributed to the formula $Al_2(OH)_xCl_y$, where x is a number from 2.5 to 5.5 and y is a number from 3.5 to 0.5 and the sum of x and y is always 6. This aluminum chlorohydrate is mixed as aqueous solution with crystallization nuclei, then dried and then subjected to a thermal treatment (calcination).

It is preferable to start from 50% strength aqueous solutions, as are commercially available. Crystallization nuclei which promote the formation of the α-modification of $Al_2O_3$ are added to such a solution. In particular, such nuclei reduce the temperature for the formation of the α-modification in the subsequent thermal treatment. Preferred nuclei are very finely disperse corundum, diaspore or hematite. Particularly preferably, very finely disperse α-$Al_2O_3$ nuclei having a mean particle size of less than 0.1 μm are employed. In general, from 2 to 3% by weight of nuclei, based on the resulting alumina, are sufficient.

This starting solution additionally contains oxide formers in order to produce the oxides MeO in the mixed oxide. The chlorides of the elements of main groups I and II of the Periodic Table are especially suitable for this purpose, in particular the chlorides of the elements Ca and Mg, but also other soluble or dispersible salts, such as oxides, oxychlorides, carbonates or sulfates. The amount of oxide former is such that the prepared nanoparticles contain from 0.01 to 50% by weight of the oxide Me. The oxides of main groups I and II may be present as a separate phase in addition to the alumina or may form genuine mixed oxides, such as, for example, spinels, etc., with it. The term "mixed oxides" in the context of this invention is to be understood as meaning that it includes both types.

This suspension of aluminum chlorohydrate, nuclei and oxide formers is then evaporated to dryness and subjected to a thermal treatment (calcination). This calcination is effected in apparatuses suitable for this purpose, for example in sliding-bat kilns, chamber furnaces, tube furnaces, rotary kilns or microwave ovens or in a fluidized-bed reactor. According to one variant of the process according to the invention, it is also possible to adopt a procedure in which the aqueous suspension of aluminum chlorohydrate, oxide formers and nuclei are sprayed directly into the calcination apparatus without prior removal of the water.

The temperature for the calcination should not exceed 1400° C. The lower temperature limit is dependent on the desired yield of nanocrystalline mixed oxide, on the desired residual chlorine content and on the content of nuclei. The formation of the nanoparticles begins at as low as about 500° C. but, in order to keep the chlorine content low and the yield of nanoparticles high, it is preferable to work at from 700 to 1100° C., in particular from 1000 to 1100° C.

Surprisingly, it has been found that in general less than 0.5 to 30 minutes, preferably 0.5 to 10, in particular 2 to 5, minutes are sufficient for the calcination. Even after this short time, a sufficient yield of nanoparticles can be achieved under the abovementioned conditions for the preferred temperatures. However, it is also possible to effect calcination for 4 hours at 700° C. or for 8 hours at 500° C. according to the information in report DKG 74 (1997) No. 11/12, page 722.

During the calcination, agglomerates are obtained in the form of virtually spherical nanoparticles. These particles consist of $Al_2O_3$ and MeO. The content of MeO acts as an inhibitor for crystal growth and keeps the crystallite size small. Consequently, the resulting nanoparticles as obtained by the calcination described above differ substantially from the particles as obtained in the processes described in DE 199 22 492; WO 2004/089827 and WO 02/08124.

For obtaining nanoparticles, the agglomerates are preferably comminuted by wet milling in a solvent, for example in an attritor mill, bead mill or stirred ball mill. Nanoparticles which have a crystallite size of less than 1 μm, preferably less than 0.2 μm, particularly preferably from 0.001 to 0.9 μm, are obtained thereby. Here too, the process described has substantial advantages since the mixed oxides prepared according to the invention form substantially softer agglomerates, which has a positive effect on the time required for the deagglomeration and on the wear in the mill. Thus, for example after milling for six hours, a suspension of nanoparticles having a d90 value of about 50 nm is obtained. Another possibility for deagglomeration is the use of ultrasound.

Both water and alcohols and other polar solvents which are capable of taking up the liberated nanoparticles in a stable manner are suitable as solvents for the deagglomeration. If the deagglomeration is effected in water, an inorganic or organic acid, for example HCl, $HNO_3$, formic acid or acetic acid, should be added in order to stabilize the resulting nanoparticles in the aqueous suspension. The amount of acid may be from 0.1 to 5% by weight, based on the mixed oxide. A further possibility is to stabilize the nanoparticles sterically by addition of acrylates, polyethylene glycols, small amounts of silane or other surface-active substances. In this method of stabilization, the nanoparticles are shielded and hence the strong attractive force between the particles is counteracted. The particle fraction having a particle diameter of less than 20 nm can then preferably be separated off from the suspension by centrifuging. The fine fractions thus obtained can then be converted into readily redispersible nanopowders by drying, such as, for example, by freeze-drying.

The deagglomeration by milling or supply of ultrasonic energy is preferably effected at temperatures of from 20 to 100° C., particularly preferably at from 20 to 90° C.

EXAMPLES

Example 1

Magnesium chloride was added to a 50% strength aqueous solution of aluminum chlorohydrate so that the ratio of alumina to magnesium oxide was 99.5:0.5% after the calcination. In addition, 2% of crystallization nuclei of a suspension of fine corundum were added to the solution. After the solution was homogenized by stirring, drying was effected in a rotary evaporator. The solid aluminum chlorohydrate/magnesium chloride mixture was comminuted in a mortar, a coarse powder forming.

The powder was calcined in a rotary kiln at 1050° C. The contact time in the hot zone was not more than 5 min. A white powder whose particle distribution corresponded to the feed material was obtained.

An X-ray structure analysis shows that predominantly α-alumina is present. The images of the SEM (scanning electron micrograph) produced showed crystallites in the range 10-80 nm (estimate from SEM), which are present as agglomerates. The residual chlorine content was only a few ppm.

In a further step, 40 g of this corundum powder doped with magnesium oxide was suspended in 160 g of water. The suspension was deagglomerated in a vertical stirred ball mill from Netzsch (type PE 075). The milling beads used consisted of zirconium oxide (stabilized with yttrium) and had a size of 0.3 mm. The pH of the suspension was checked every 30 min and kept at pH 4-4.5 by addition of dilute nitric acid. After 6 hours, the suspension was separated off from the milling beads and characterized with regard to particle distribution with the aid of an analytical disk centrifuge from Brookhaven. A d90 of 54 nm, a d50 of 42 nm and a d10 of 22 nm were found. The nanosuspension comprising the mixed oxides is thus substantially finer than comparable suspensions comprising pure α-alumina.

Example 2

Calcium chloride was added to a 50% strength aqueous solution of aluminum chlorohydrate so that the ratio of alumina to calcium oxide was 99.5:0.5% after the calcination. In addition, 2% of crystallization nuclei of a suspension of fine corundum were added to the solution. After the solution was homogenized by stirring, drying was effected in a rotary evaporator. The solid aluminum chlorohydrate/calcium chloride mixture was comminuted in a mortar, a coarse powder forming.

The powder was calcined in a rotary kiln at 1050° C. The contact time in the hot zone was not more than 5 min. A white powder whose particle distribution corresponded to the feed material was obtained.

An X-ray structure analysis shows that predominantly α-alumina is present.

The images of the SEM (scanning electron micrograph) produced showed crystallites in the range 10-80 nm (estimate from SEM), which are present as agglomerates. The residual chlorine content was only a few ppm.

In a further step, 40 g of this corundum powder doped with calcium oxide was suspended in 160 g of water. The suspension was deagglomerated in a vertical stirred ball mill from Netzsch (type PE 075). The milling beads used consisted of zirconium oxide (stabilized with yttrium) and had a size of 0.3 mm. The pH of the suspension was checked every 30 min and kept at pH 4-4.5 by addition of dilute nitric acid. After 6 hours, the suspension was separated off from the milling beads and characterized with regard to particle distribution with the aid of an analytical disk centrifuge from Brookhaven. A d90 of 77 nm, a d50 of 55 nm and a d10 of 25 nm were found. The nanosuspension comprising the mixed oxides is thus substantially finer than comparable suspensions comprising pure α-alumina.

The invention claimed is:

1. A process for the preparation of nanoparticles wherein the nanoparticles consist of 50-99.99% by weight of alumina in the rhombohedral α-modification and 0.01-50% by weight of a metal oxide of elements of main group I or II of the Periodic Table comprising the steps of adding a crystallization nuclei, oxide formers comprising elements of main groups I and II of the Periodic Table to aluminum chlorohydrate, thermally treating the combined crystallization nuclei and oxide formers, and aluminum chlorohydrate for between 0.5 and 30 minutes to form agglomerates and comminuting the agglomerates.

2. The process as claimed in claim 1, wherein the aluminum chlorohydrat is a compound of the chemical formula $Al_2(OH)_xCl_y$, wherein x is a number from 2.5 to 5.5, y is a number from 3.5 to 0.5, and the sum of x+y is always 6.

3. The process as claimed in claim 1, wherein the crystallization nuclei is very finely dispersed $\alpha$-$Al_2O_3$, hematite or diaspore.

4. The process as claimed in claim 3, wherein the very finely dispersed $\alpha$-$Al_2O_3$ crystallization nuclei have a mean particle size of less than 0.1 μm.

5. The process as claimed in claim 1, wherein the combination of aluminum chlorohydrate, crystallization nuclei and oxide formers is an aqueous suspension.

6. The process as claimed in claim 1, wherein the thermally treating step is carried out in a sliding-bat kiln, chamber furnace, tube furnace, rotary kiln, microwave oven, or in a fluidized-bed reactor.

7. The process as claimed in claim 1, wherein the thermally treating step is carried out at a temperature below 100° C.

8. The process as claimed in claim 1, wherein the thermally treating step is carried out at from 700 to 1100° C.

9. The process as claimed in claim 5, wherein the aqueous suspension comprising aluminum chlorohydrate and nuclei is injected directly into the thermally treating step apparatus without prior removal of the any water.

10. The process as claimed in claim 1, wherein the agglomerates are comminuted in a subsequent step by wet or dry milling.

11. The process as claimed in claim 1, wherein the agglomerates are comminuted by ultrasound.

12. The process as claimed in claim 1, wherein the agglomerates are comminuted at from 20 to 90° C.

13. The process as claimed in claim 1, wherein the suspensions obtained in the comminuting step are converted into a powder with soft agglomerates by spray-drying, freeze-drying or other drying methods.

14. The process as claimed in claim 1, wherein the suspensions obtained in the comminuting step are centrifuged and the clear to slightly opalescent supernatants comprising nanoparticles <20 nm are separated off.

15. The process as claimed in claim 14, wherein the suspensions obtained after the centrifuging are dried by spray-drying, freeze-drying or other drying methods and a readily redispersible powder is formed thereby.

16. The process as claimed in claim 5, wherein the aqueous suspension is first dried and the dried product is then thermally treated.

17. The process as claimed in claim 1, wherein the thermally treating step is carried out in from 0.5 to 10 minutes.

18. The process as claimed in claim 1, wherein the thermally treating step is carried out in from 2 to 5 minutes.

* * * * *